US012739898B2

(12) United States Patent
Chen

(10) Patent No.: US 12,739,898 B2
(45) Date of Patent: Sep. 15, 2026

(54) MULTI-DEVICE SYSTEM, WIRELESS CONNECTION METHOD AND NON-TRANSITORY COMPUTER READABLE STORAGE MEDIUM

(71) Applicant: HTC Corporation, Taoyuan City (TW)

(72) Inventor: Kai-Hsiu Chen, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 383 days.

(21) Appl. No.: 18/501,016

(22) Filed: Nov. 2, 2023

(65) Prior Publication Data

US 2024/0381449 A1 Nov. 14, 2024

Related U.S. Application Data

(60) Provisional application No. 63/500,623, filed on May 8, 2023.

(51) Int. Cl.
*H04W 76/10* (2018.01)
*H04W 36/00* (2009.01)

(52) U.S. Cl.
CPC ....... *H04W 76/10* (2018.02); *H04W 36/0022* (2013.01)

(58) Field of Classification Search
CPC ..... H04W 76/10; H04W 76/16; H04W 76/23; H04W 36/0022; H04W 36/03; H04W 36/0016; H04W 36/0005; H04W 36/0009; H04W 4/08; H04W 4/80; H04W 84/18; H04W 84/12; H04W 8/186
See application file for complete search history.

(56) References Cited

U.S. PATENT DOCUMENTS

2012/0320886 A1 12/2012 Anders, Jr. et al.
2013/0044739 A1 2/2013 Huang
2014/0112324 A1* 4/2014 Kwon .................. H04W 8/005 370/338

(Continued)

FOREIGN PATENT DOCUMENTS

EP 2723108 A2 4/2014
WO 2014159223 A2 10/2014

OTHER PUBLICATIONS

"Wi-Fi Peer-to-Peer (P2P) Technical Specification version 1.5", Aug. 4, 2014 (Aug. 4, 2014), pp. 1-183, XP055234860, Retrieved from the Internet: URL:https://www.wi-fi.org/discover-wi-fi/specifications.

(Continued)

*Primary Examiner* — Brian T Le
(74) *Attorney, Agent, or Firm* — CKC & Partners Co., LLC

(57) ABSTRACT

The present disclosure provides a wireless connection method applicable to a multi-device system, wherein the multi-device system includes a first electronic device and a second electronic device, and the wireless connection method includes: based on that the first electronic device is connected to a network access device, by the first electronic device, enabling a wireless communication function through a first channel, wherein a first wireless connection is established between the first electronic device and the network access device at the first channel; and by the first electronic device, establishing a second wireless connection with the second electronic device at the first channel.

18 Claims, 7 Drawing Sheets

(56) References Cited

U.S. PATENT DOCUMENTS

| | | | | |
|---|---|---|---|---|
| 2015/0296416 | A1* | 10/2015 | Lee | H04W 76/14 370/331 |
| 2018/0359664 | A1* | 12/2018 | Kim | H04W 36/0011 |
| 2021/0084466 | A1 | 3/2021 | Jain | |
| 2021/0211902 | A1* | 7/2021 | Achyuth | H04W 24/04 |
| 2022/0141632 | A1 | 5/2022 | Jain | |

OTHER PUBLICATIONS

The search report of the corresponding European application No. EP 24170786.8 issued on Oct. 2, 2024.

The office action of the corresponding Taiwanese application No. TW113112619 issued on Feb. 18, 2025.

* cited by examiner

MULTI-DEVICE SYSTEM, WIRELESS CONNECTION METHOD AND NON-TRANSITORY COMPUTER READABLE STORAGE MEDIUM

CROSS-REFERENCE TO RELATED APPLICATION

This application claims priority to U.S. Provisional Application Ser. No. 63/500,623, filed on May 8, 2023, which is herein incorporated by reference.

BACKGROUND

Field of Invention

This disclosure relates to a system and method, in particular to a multi-device system and wireless connection method.

Description of Related Art

In applications of Wi-Fi protocol, a main Wi-Fi device can operate as Wi-Fi station (STA) to connect Internet with Wi-Fi access point (AP). At the same time, the main Wi-Fi device can communicate with accessory Wi-Fi devices by Wi-Fi peer-to-peer (P2P) technologies (or Wi-Fi Direct technologies). However, the main Wi-Fi device may face the problem of Wi-Fi throughput being downgraded because the main Wi-Fi device have to continuously switch between two different transmission channels for operating as Wi-Fi STA and communicating by the Wi-Fi P2P technologies. Therefore, it is necessary to provide an approach to address the above problem caused due to the concurrence of operating as Wi-Fi STA and communicating by the Wi-Fi P2P technologies.

SUMMARY

An aspect of present disclosure relates to a wireless connection method applicable to a multi-device system, wherein the multi-device system includes a first electronic device and a second electronic device, and the wireless connection method includes: based on that the first electronic device is connected to a network access device, by the first electronic device, enabling a wireless communication function through a first channel, wherein a first wireless connection is established between the first electronic device and the network access device at the first channel; and by the first electronic device, establishing a second wireless connection with the second electronic device at the first channel.

Another aspect of present disclosure relates to a multi-device system. The multi-device system includes a first electronic device and a second electronic device. The first electronic device is configured to connect a network access device, and is configured to enable a wireless communication function through a first channel in a condition that the first electronic device is connected to the network access device, wherein a first wireless connection is established between the first electronic device and the network access device at the first channel. The second electronic device is configured to establish a second wireless connection with the first electronic device at the first channel.

Another aspect of present disclosure relates to a non-transitory computer readable storage medium with a computer program to execute a wireless connection method applicable to a multi-device system, wherein the multi-device system includes a first electronic device and a second electronic device, and the wireless connection method includes: based on that the first electronic device is connected to a network access device, by the first electronic device, enabling a wireless communication function through a first channel, wherein a first wireless connection is established between the first electronic device and the network access device at the first channel; and by the first electronic device, establishing a second wireless connection with the second electronic device at the first channel.

It is to be understood that both the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
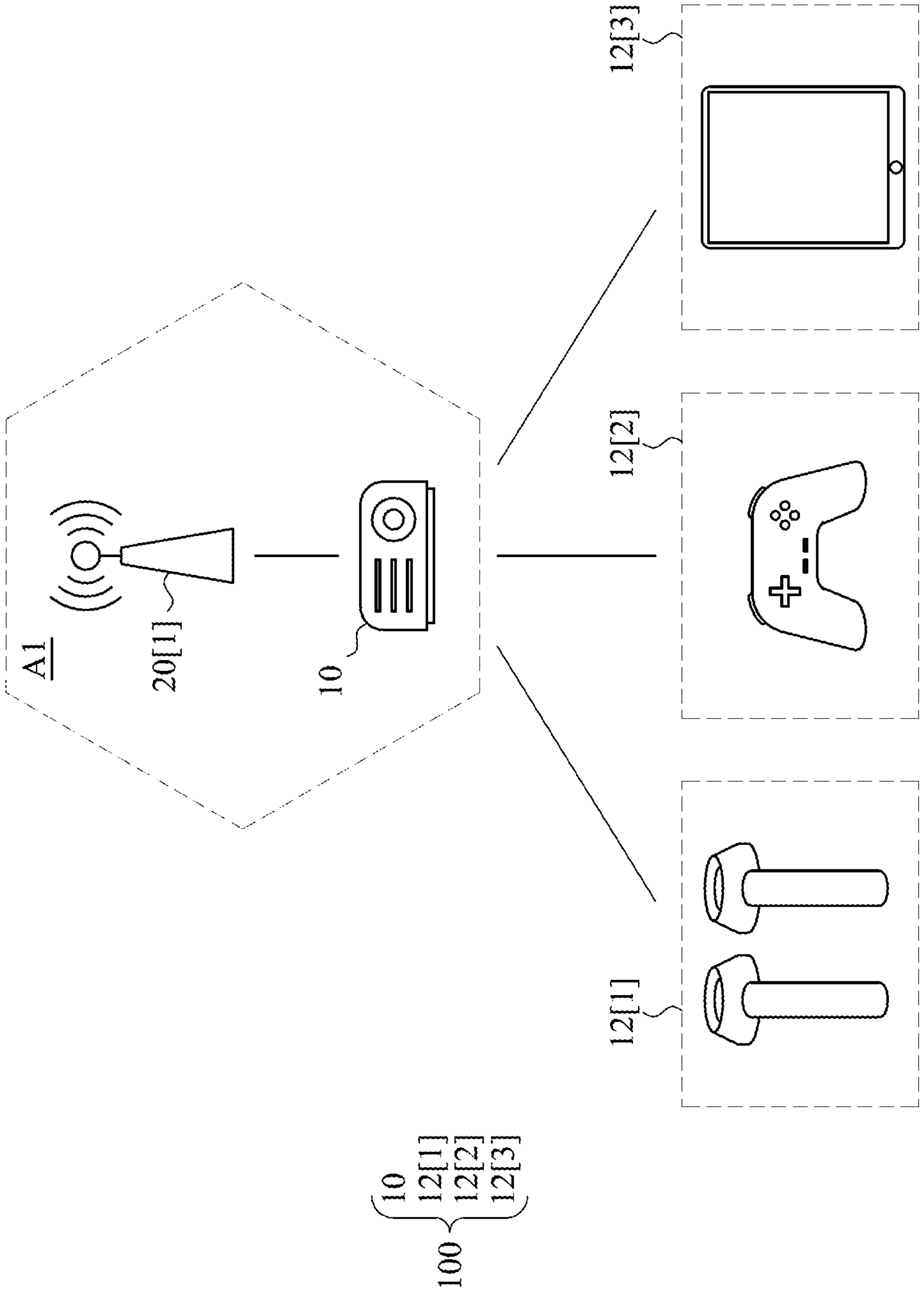
FIG. 1 is a schematic diagram of a multi-device system in accordance with some embodiments of the present disclosure.

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

As used herein, "coupled" and "connected" may be used to indicate that two or more elements physical or electrical contact with each other directly or indirectly, and may also be used to indicate that two or more elements cooperate or interact with each other.

In the following embodiments, if the reference character of components or signals is used without specifying the index of the reference character of components or signals, it indicates that reference character of components or signals is referred to any one in belonged component group or signal group. For example, the second electronic devices 12 is referred to anyone of the second electronic devices 12[1]-12[3].

Referring to FIG. 1, FIG. 1 is a schematic diagram of a multi-device system 100 in accordance with some embodiments of the present disclosure. In some embodiments, the multi-device system 100 includes a first electronic device 10 and multiple second electronic devices 12[1]-12[3]. As shown in FIG. 1, a network access device 20[1] is responsible for providing a network service (not shown) in an area A1 (i.e., the area A1 can be regarded as a service area of the network access device 20[1]). When the first electronic device 10 is moved into the area A1, the first electronic device 10 can receive the network service via the network access device 20[1]. Notably, the first electronic device 10 can communicate with the second electronic devices 12[1]-12[3] based on channel information obtained from a connection between the first electronic device 10 and the network access device 20[1]. In such configurations, the first electronic device 10 can avoid the hassle of switching communication or transmission channel.

In some embodiments, each one of the first electronic device 10 and the second electronic devices 12[1]-12[3] can operate in Wi-Fi peer-to-peer (P2P) mode (i.e., Wi-Fi Direct mode). In particular, one of the first electronic device 10 and the second electronic devices 12[1]-12[3] can operate as P2P Group Owner (GO), and the others of the first electronic device 10 and the second electronic devices 12[1]-12[3] can operate as P2P Group Client (GC). For realizing the configurations in FIG. 1, the first electronic device 10 operates as the P2P GO, and the second electronic devices 12[1]-12[3] each operates as the P2P GC. Furthermore, in FIG. 1, the network access device 20[1] operates in Wi-Fi access point (AP) mode, in which the network access device 20[1] can be implemented by Wi-Fi AP. In order to receive the network service via the network access device 20[1], the first electronic device 10 can operate in Wi-Fi station (STA) mode. As can be seen from the above descriptions, the first electronic device 10 can operate in both the Wi-Fi P2P mode (as the P2P GO) and the Wi-Fi STA mode, so as to communicate with the network access device 20[1] and the second electronic devices 12[1]-12[3].

In the above embodiments, the first electronic device 10 can be implemented by the device capable of operating in at least one of the Wi-Fi P2P mode (as the P2P GO) and the Wi-Fi STA mode, and the second electronic devices 12[1]-12[3] each can be implemented by the device capable of operating in the Wi-Fi P2P mode (as the P2P GC). In some practical applications, as shown in FIG. 1, the first electronic device 10 can be a head-mounted device (HMD). The second electronic device 12[1] can be controller or other accessories for an immersive content (e.g., virtual reality (VR) environment, augmented reality (AR) environment, mixed reality (MR) environment etc.) provided by the HMD. The second electronic device 12[2] can be gamepad or other entertainment devices. The second electronic device 12[3] can be mobile device (e.g., tablet, smartphone, etc.).

As can be understood, the configuration of the multi-device system 100 is not limited to those shown in FIG. 1. For example, in some embodiments, the multi-device system 100 can include the first electronic device 10 and at least one second electronic device 12 (e.g., one of the second electronic devices 12[1]-12[3] in FIG. 1). Since the second electronic devices 12[1]-12[3] may all have same operation, following embodiments would be described with the first electronic device 10 and the second electronic device 12[1] only.

Figure 2:
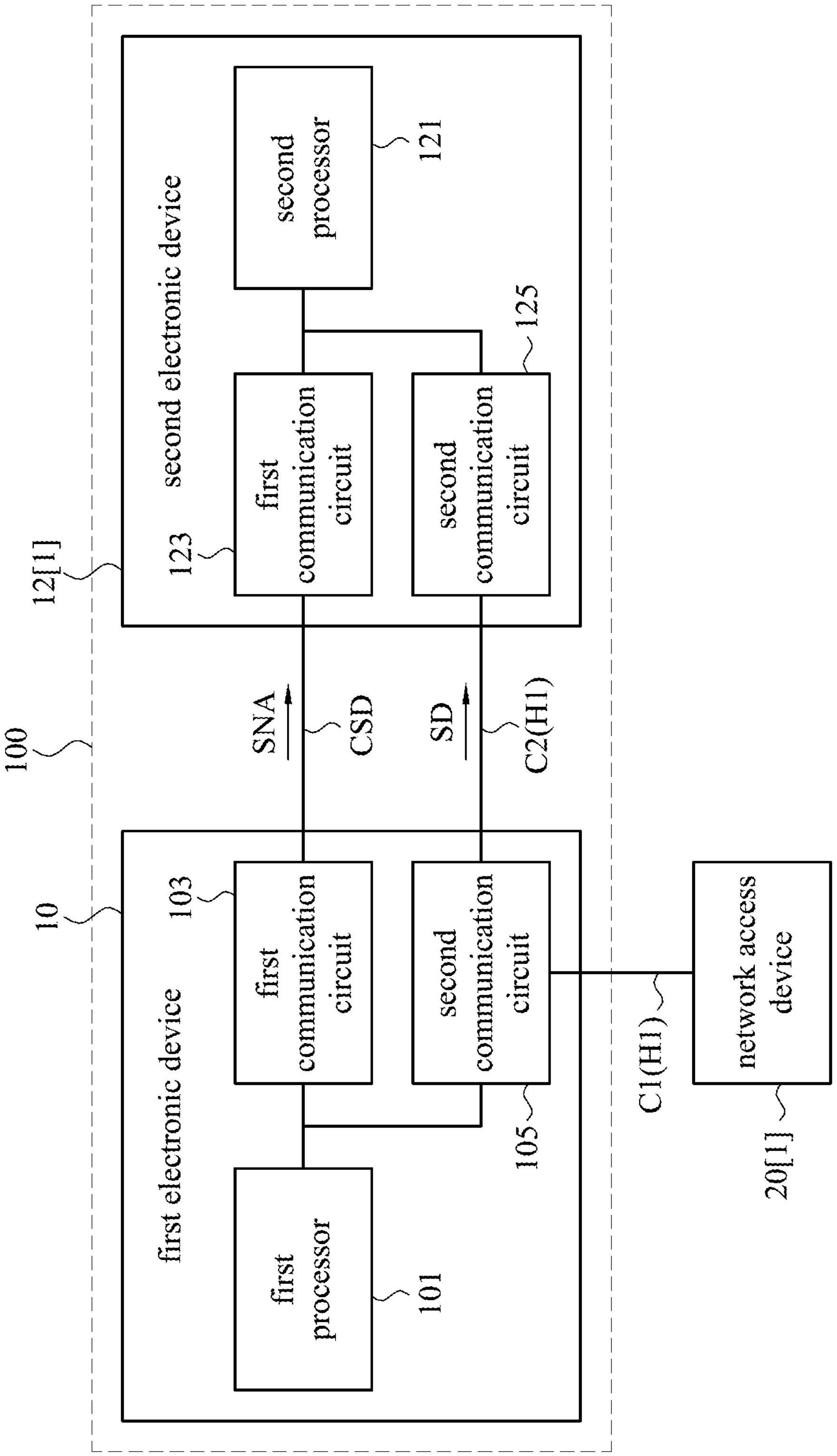
FIG. 2 is a block diagram of a first electronic device, a second electronic device and a network access device in accordance with some embodiments of the present disclosure.

Referring to FIG. 2, FIG. 2 is a block diagram of the first electronic device 10, the second electronic device 12[1] and the network access device 20[1] in FIG. 1. In the embodiments of FIG. 2, the first electronic device 10 includes a first processor 101, a first communication circuit 103 and a second communication circuit 105. The first processor 101 is coupled to the first communication circuit 103 and the second communication circuit 105. The second electronic device 12[1] includes a second processor 121, a first communication circuit 123 and a second communication circuit 125. The second processor 121 is coupled to the first communication circuit 123 and the second communication circuit 125. In particular, the first processor 101 and the second processor 121 each can be implemented by central processing unit (CPU), application-specific integrated circuit (ASIC), microprocessor, system on a Chip (SoC) or other suitable processing circuits. The first communication circuit 103 and the first communication circuit 123 each can support Bluetooth Low Energy (BLE) protocol, Bluetooth protocol or other short distance communication protocols. The second communication circuit 105 and the second communication circuit 125 each can support Wi-Fi protocol or other long distance communication protocols.

In some embodiments, at the beginning of operation of the multi-device system 100, the first communication circuit 123 of the second electronic device 12[1] would try to establish a short distance wireless connection CSD with the first communication circuit 103 of the first electronic device 10 under one of the short distance communication protocols (e.g., the BLE protocol). If the first communication circuit 123 cannot establish the short distance wireless connection CSD with the first communication circuit 103, the second electronic device 12[1] would soon be turned off by the second processor 121 for saving power of the second electronic device 12[1].

In some embodiments, the network access device 20[1] may include a communication circuit (not shown) supporting Wi-Fi protocol or other long distance communication protocols. The first processor 101 would control the second communication circuit 105 to search at least one network access device 20 available in proximity to the first electronic device 10 for connection. In some embodiments, the network access device 20[1] is found available. In such condition, as shown in FIG. 1, the second communication circuit 105 of the first electronic device 10 would establish a first wireless connection C1 with the network access device 20[1] under one of the long distance communication protocols (e.g., the Wi-Fi protocol). In some further embodiments, the first processor 101 can be informed by the second communication circuit 105 that the first wireless connection C1 is established at a first channel H1 (i.e., the channel information). The second communication circuit 105 of the first electronic device 10 would establish a second wireless connection C2 with the second communication circuit 125 of the second electronic device 12[1] under one of the long distance communication protocols (e.g., the Wi-Fi protocol) at the same first channel H1.

If no network access device 20 is found available, the second communication circuit 105 of the first electronic device 10 would establish the second wireless connection C2 with the second communication circuit 125 of the second electronic device 12[1] under one of the long distance communication protocols (e.g., the Wi-Fi protocol) at a predetermined channel. The predetermined channel might be different from the first channel H1. As can be seen from the above description, the first electronic device 10 is configured to establish the second wireless connection C2 with the second electronic device 12[1] at one of multiple transmission channels, in which the one of the multiple transmission channels can be selected according to the search result of the network access device 20 available in proximity to the first electronic device 10.

In the above embodiments, both the first wireless connection C1 and the second wireless connection C2 are greater than the short distance wireless connection CSD in transmission bandwidth and transmission speed.

Figure 3:
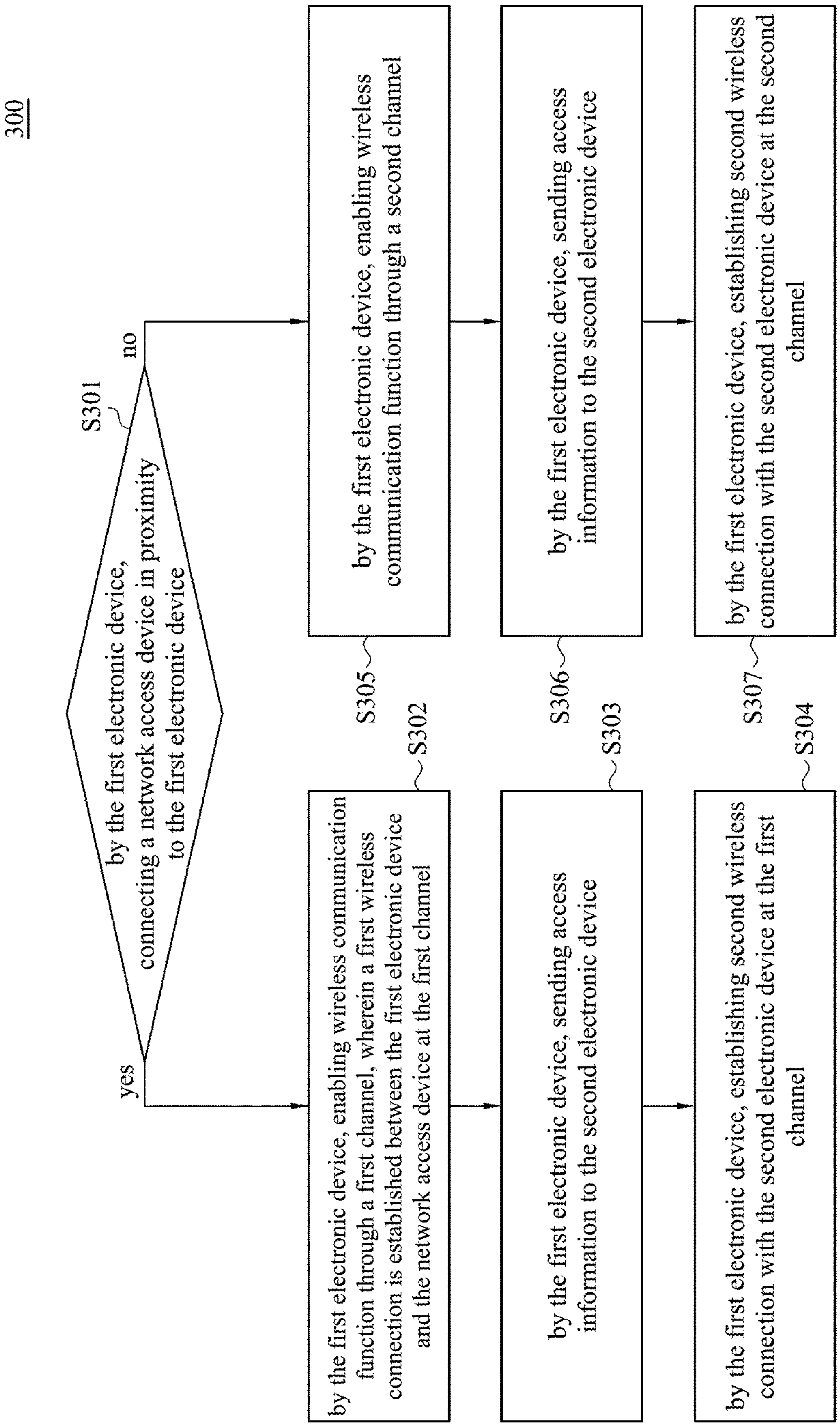
FIG. 3 is a flow diagram of a wireless connection method in accordance with some embodiments of the present disclosure.

The operation of the first electronic device 10 and the second electronic device 12[1] of the multi-device system 100 would be further described with reference to a wireless connection method 300 applicable to the multi-device system 100. Referring to FIG. 3, FIG. 3 is a flow diagram of the wireless connection method 300 in accordance with some embodiments of the present disclosure. In some embodiments, as shown in FIG. 3, the wireless connection method 300 includes operations S301-S307.

Figure 4:
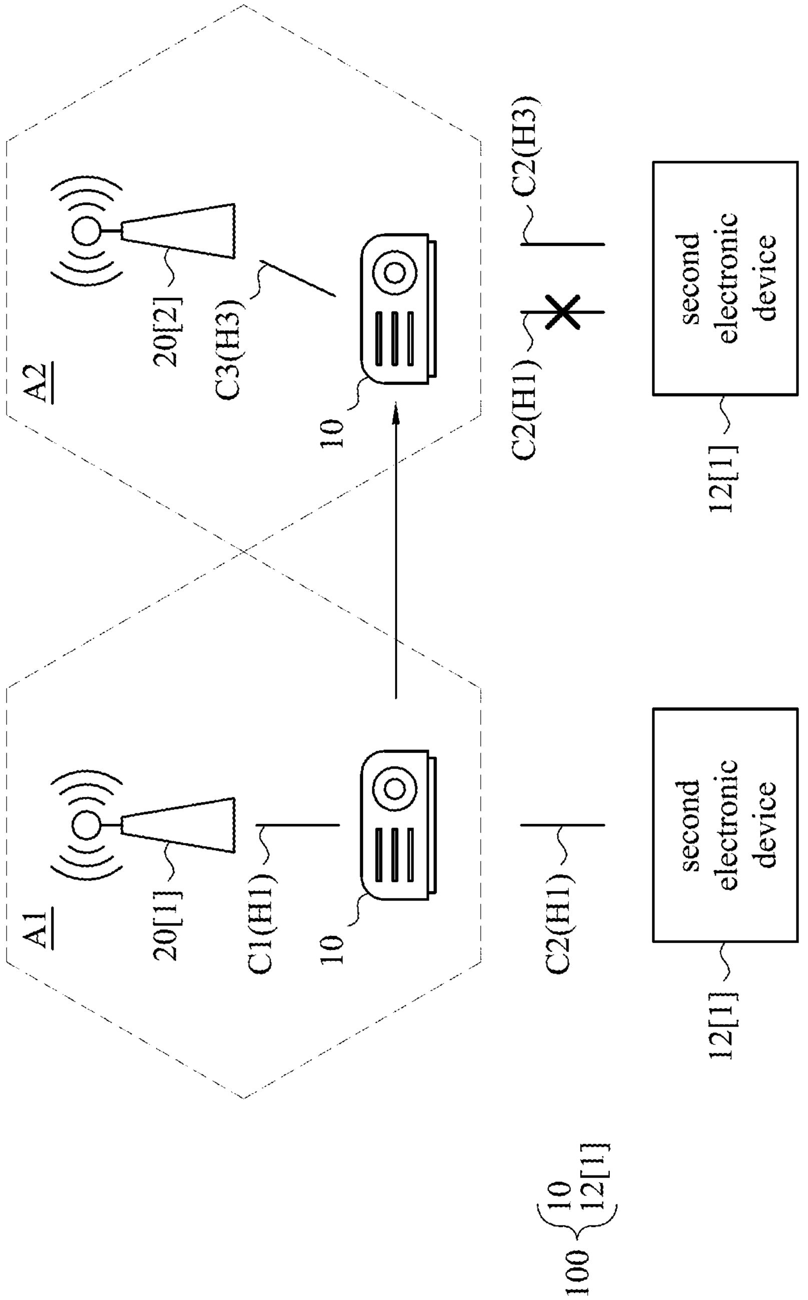
FIG. 4 is a schematic diagram of a scenario of the multi-device system in accordance with some embodiments of the present disclosure.
Figure 5:
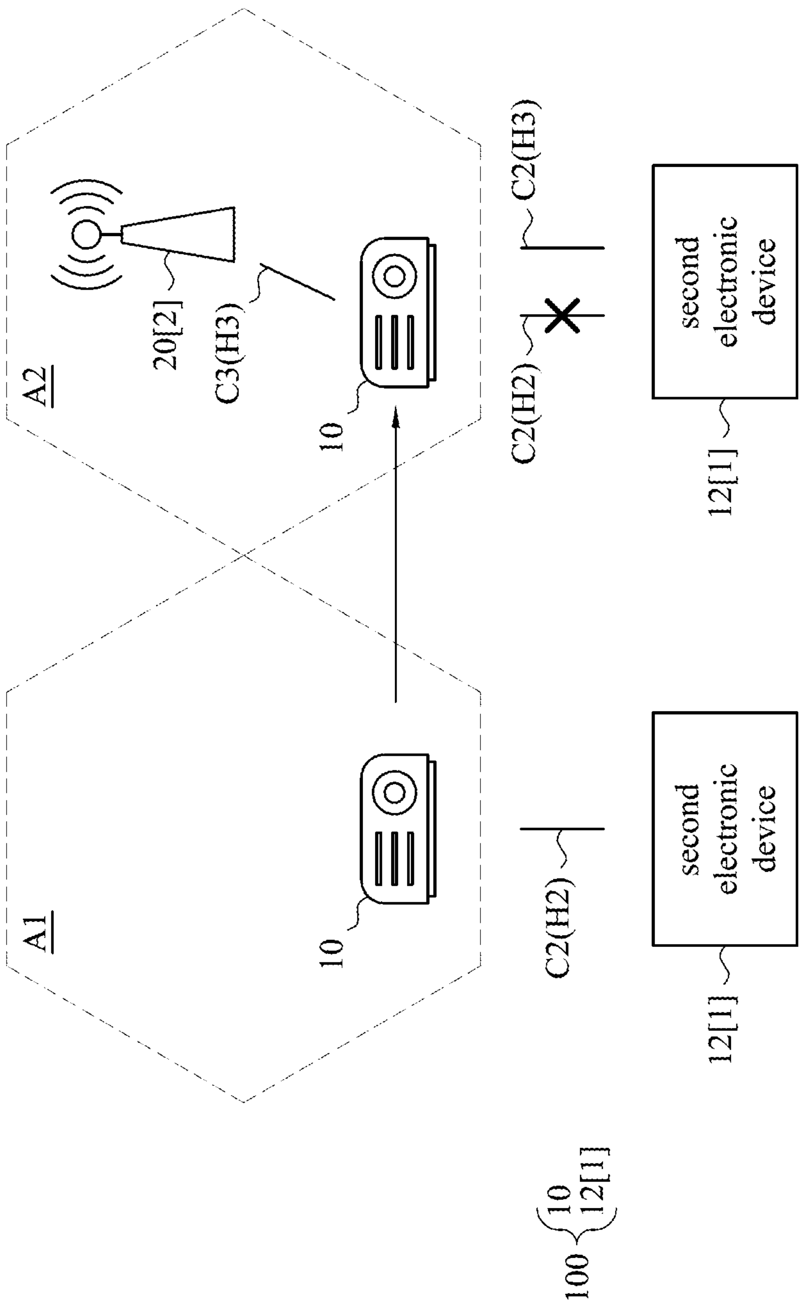
FIG. 5 is a schematic diagram of another scenario of the multi-device system in accordance with some embodiments of the present disclosure.

In operation S301, it is determined whether the first electronic device 10 connects a network access device 20 (e.g., the network access device 20[1] in FIG. 1 or 2) in proximity to the first electronic device 10. The determination in operation S301 would be described in detail below with reference to FIGS. 4 and 5. FIGS. 4 and 5 are schematic diagrams of different scenarios of the multi-device system 100 in accordance with some embodiments of the present disclosure.

In the embodiments of FIG. 4, the first electronic device 10 finds the network access device 20[1] available in the area A1, and thus connects the network access device 20[1]. The descriptions of connecting the first electronic device 10 and the network access device 20[1] can refer to the descriptions of establishing the first wireless connection C1 at the first channel H1 in the embodiments of FIG. 2, and therefore are omitted herein. As shown in FIG. 3, operation S302 is executed.

In operation S302, the first electronic device 10 enables a wireless communication function through the first channel H1. In some embodiments, the wireless communication function is a Wi-Fi P2P (or Wi-Fi direct) communication function. In order to enable the Wi-Fi P2P communication function through the first channel H1, the first electronic device 10 creates a P2P group by setting P2P group name, access password and transmission channel. In particular, the P2P group name and the access password is information required by other devices (e.g., the second electronic device 12[1]) to access or join the P2P group. In addition, the transmission channel is set to be the first channel H1, so that the transmission in the P2P group would be performed at the first channel H1.

By creating the P2P group, the first electronic device 10 operates as the P2P GO of the P2P group, and operation S303 is executed. In operation S303, as shown in FIG. 2, the first electronic device 10 sends access information SNA to the second electronic device 12[1]. In some embodiments of operation S303, the first electronic device 10 sends P2P group information of the P2P group as the access information SNA through the short distance wireless connection CSD, in which the P2P group information of the P2P group may include the P2P group name, the access password and channel information indicating the transmission channel (i.e., the first channel H1) at least. The second electronic device 12[1] receives the access information SNA then. In some embodiments, the P2P group name is known as Service Set Identifier (SSID). In other words, the access information SNA may include the SSID, the access password and the channel information indicating the first channel H1.

In response to the reception of the access information SNA, the second electronic device 12[1] sends a group join request (not shown) to the first electronic device 10 to attempt to join the P2P group created by the first electronic device 10. The first electronic device 10 can check information carried by the group join request against the P2P group information set by the first electronic device 10, so as to authenticate the second electronic device 12[1] as the P2P GC of the P2P group. In other words, the second electronic device 12[1] is joined to the P2P group. Then, operation S304 is executed.

In operation S304, as shown in FIG. 4, the first electronic device 10 establishes the second wireless connection C2 with the second electronic device 12[1] at the first channel H1. The descriptions of establishing the second wireless connection C2 at the first channel H1 can refer to the descriptions of the embodiments of FIG. 2, and therefore are omitted herein. In some embodiments, as shown in FIG. 2, the first electronic device 10 is configured to transmit a data information SD through the second wireless connection C2. In particular, the data information SD may be time synchronization data for synchronizing multiple electronic devices in the multi-device system 100, map data of physical environment where the multi-device system 100 is, data for updating the map data, or any data with large amount of volume.

Backing the descriptions of operation S301, in some embodiments, as shown in FIG. 5, the first electronic device 10 finds no network access device 20[1] available in the area A1, and thus does not connect the network access device 20[1]. As shown in FIG. 3, operation S305 is executed.

In operation S305, the first electronic device 10 enables a wireless communication function through a second channel H2 (i.e., the predetermined channel). The descriptions of operation S305 can refer to the descriptions of operation S302, and therefore are omitted herein. The difference between operation S302 and operation S305 is that the transmission channel of the P2P group created in operation S305 is set to be the second channel H2 or a random channel.

In operation S306, the first electronic device 10 sends the access information SNA to the second electronic device 12[1]. The descriptions of operation S306 can refer to the descriptions of operation S303, and therefore are omitted herein. That is to say, in some embodiments of operation S306, the access information SNA may include the SSID (i.e., the P2P group name), the access password and the channel information indicating the second channel H2. In such way, the second electronic device 12[1] can join the P2P group created at the second channel H2 by the first electronic device 10.

In operation S307, as shown in FIG. 5, the first electronic device 10 establishes the second wireless connection C2 with the second electronic device 12[1] at the second channel H2. The descriptions of establishing the second wireless connection C2 at the second channel H2 can refer to the descriptions of the embodiments of FIG. 2, and therefore are omitted herein. As can be understood, in the condition that the second wireless connection C2 is established at the second channel H2, the first electronic device 10 can still transmit the data information SD through the second wireless connection C2.

The wireless connection method 300 is not limited to operations S301-S307 shown in FIG. 3, which would be described with reference to FIGS. 6 and 7. Referring to FIG.

Figure 6:
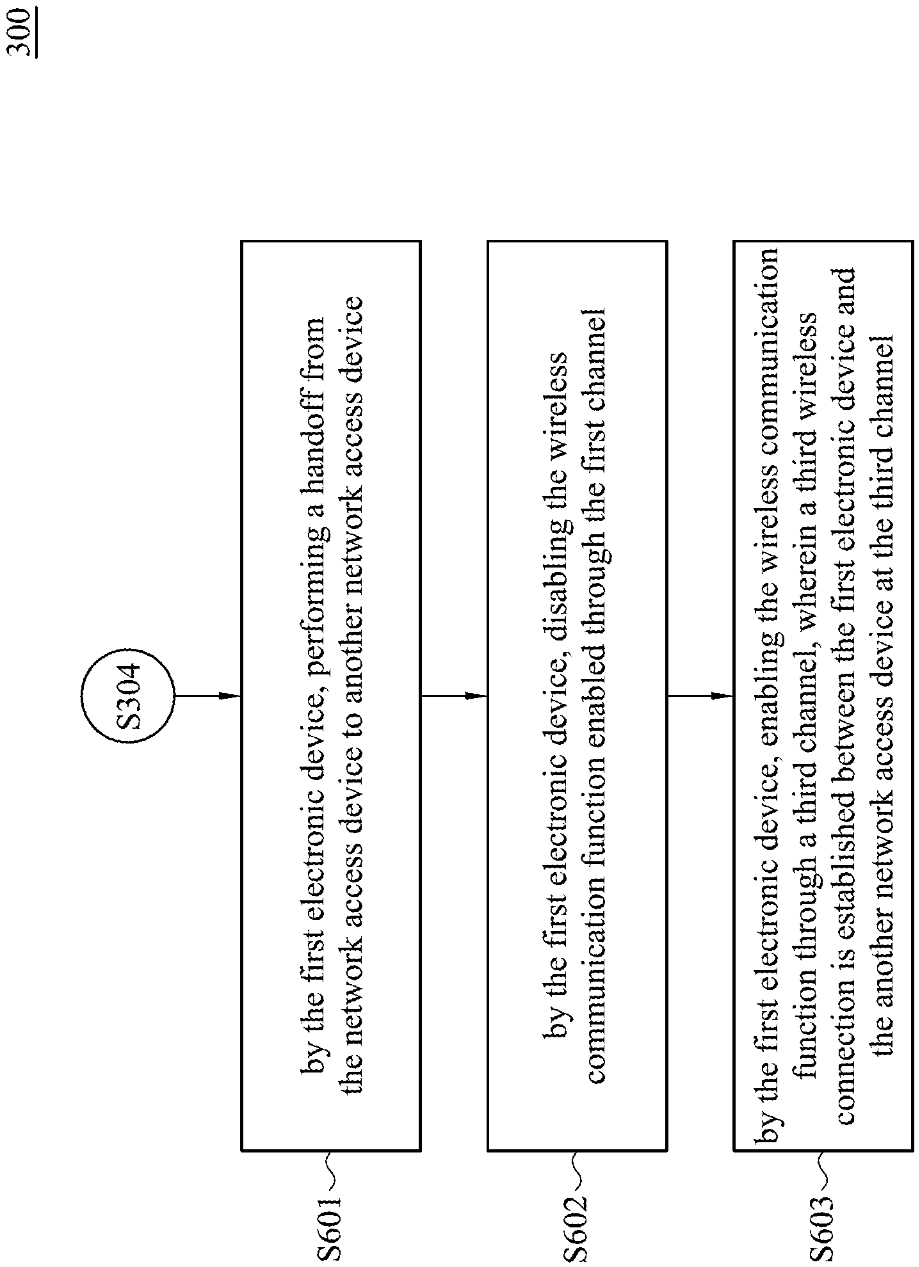
FIG. 6 is a flow diagram of a wireless connection method in accordance with some embodiments of the present disclosure.

6, FIG. 6 is a flow diagram of the wireless connection method 300 in accordance with some embodiments of the present disclosure. In some embodiments, the wireless connection method 300 further includes operation S601-S603, which would be described in detail below with reference to FIG. 4.

In the embodiments of FIG. 4, after the first electronic device 10 establishes the first wireless connection C1 and the second wireless connection C2 (both at the first channel H1) with the network access device 20[1] and the second electronic device 12[1] respectively (i.e., operations S301-S304), the first electronic device 10 and the second electronic device 12[1] might be moved. For example, user of the multi-device system 100 might carry the first electronic device 10 implemented by the HMD and the second electronic device 12[1] implemented by the controller in the physical environment such as a gaming place. The network access device 20[1] and another network access device 20[2] can be disposed in different positions in the physical environment, in which the network access device 20[2] can also be implemented by the Wi-Fi AP. When the user walks in the physical environment, as shown in FIG. 4, the first electronic device 10 might be moved from the area A1 into another area A2 where the network access device 20[2] is responsible for providing the network service. As can be understood, the first electronic device 10 might still receive the network service via the network access device 20[1] at this point because the area A1 and the area A2 might partially overlap with each other. In such conditions, operation S601 is executed.

In operation S601, the first electronic device 10 performs a handoff from the network access device 20[1] to the network access device 20[2]. In some embodiments, the second communication circuit 105 of the first electronic device 10 might transmit connection information (not shown) of the first wireless connection C1 and a handoff request signal (not shown) to the network access device 20[2] to attempt to perform the handoff. After the network access device 20[2] receives the connection information of the first wireless connection C1 and the handoff request signal, the first electronic device 10 might switch from connecting the network access device 20[1] to connecting the network access device 20[2], so that the first electronic device 10 receives the network service via the network access device 20[2]. As shown in FIG. 4, the first electronic device 10 moved into the area A2 establishes a third wireless connection C3 with the network access device 20[2] under one of the long distance communication protocols (e.g., the Wi-Fi protocol) at a third channel H3 different from the first channel H1. The handoff can be accomplished by known technologies in related arts, and therefore detailed descriptions thereof are omitted herein.

In operation S602, the first electronic device 10 disables the wireless communication function enabled through the first channel H1. In some embodiments, the first electronic device 10 removes the P2P group created at the first channel H1 (i.e., the P2P group created by the first electronic device 10 in operation S302) to disable the wireless communication function enabled through the first channel H1. As can be understood, before the P2P group created at the first channel H1 is removed, both the first electronic device 10 and the second electronic device 12[1] are in the P2P group created at the first channel H1. For example, the P2P group name, the access password and the transmission channel of the P2P group created at the first channel H1 are cleared from the first electronic device 10. As shown in FIG. 4, by disabling the wireless communication function enabled through the first channel H1, the second wireless connection C2 established at the first channel H1 is cancelled.

In operation S603, the first electronic device 10 enables the wireless communication function through the third channel H3. The descriptions of operation S603 can refer to the descriptions of operation S302, and therefore are omitted herein. As shown in FIG. 4, after enabling the wireless communication function again through the third channel H3 (i.e., operation S603), the first electronic device 10 would establish the second wireless connection C2 again with the second electronic device 12[1] at the third channel H3. The descriptions of establishing the second wireless connection C2 with the second electronic device 12[1] at the third channel H3 can refer to the descriptions of operations S303 and S304, and therefore are omitted herein.

Figure 7:
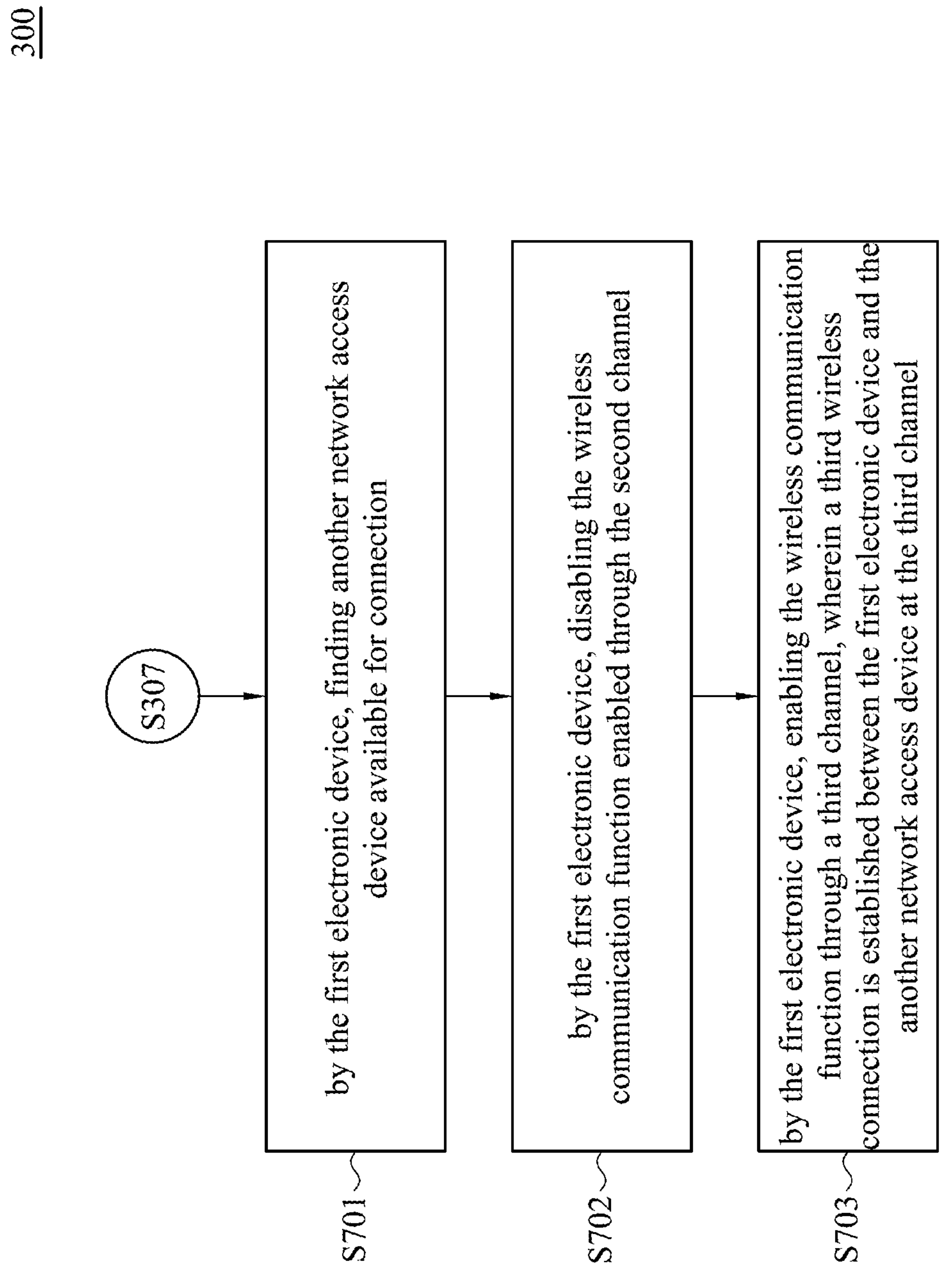
FIG. 7 is a flow diagram of a wireless connection method in accordance with some embodiments of the present disclosure.

Referring to FIG. 7, FIG. 7 is a flow diagram of the wireless connection method 300 in accordance with some embodiments of the present disclosure. In some embodiments, the wireless connection method 300 further includes operation S701-S703, which would be described in detail below with reference to FIG. 5.

In the embodiments of FIG. 5, after the first electronic device 10 establishes the second wireless connection C2 at the second channel H2 with the second electronic device 12[1] respectively (i.e., operations S301 and S305-S307), the first electronic device 10 and the second electronic device 12[1] might be moved by, for example, the aforementioned user of the multi-device system 100. As shown in FIG. 5, the first electronic device 10 might be moved from the area A1 into the area A2 where the network access device 20[2] is responsible for providing the network service. In such conditions, operation S701 is executed.

In operation S701, the first electronic device 10 finds the network access device 20[2] available for connection. In some embodiment, as shown in FIG. 5, the first electronic device 10 moved into the area A2 establishes the third wireless connection C3 with the network access device 20[2] under one of the long distance communication protocols (e.g., the Wi-Fi protocol) at the third channel H3 different from the second channel H2, so that the first electronic device 10 receives the network service via the network access device 20[2].

In operation S702, the first electronic device 10 disables the wireless communication function enabled through the second channel H2. The descriptions of operation S702 can refer to the descriptions of operation S602, and therefore are omitted herein. As shown in FIG. 5, by disabling the wireless communication function enabled through the second channel H2, the second wireless connection C2 established at the second channel H2 is cancelled.

In operation S703, the first electronic device 10 enables the wireless communication function through the third channel H3. The descriptions of operation S703 can refer to the descriptions of operation S302, and therefore are omitted herein. As shown in FIG. 5, after enabling the wireless communication function again through the third channel H3 (i.e., operation S703), the first electronic device 10 would establish the second wireless connection C2 again with the second electronic device 12[1] at the third channel H3. The descriptions of establishing the second wireless connection C2 with the second electronic device 12[1] at the third channel H3 can refer to the descriptions of operations S303 and S304, and therefore are omitted herein.

As can be seen from the above embodiments of the present disclosure, by establishing the second wireless connection C2 between the first electronic device 10 and the second electronic device 12 at the same transmission channel (i.e., the first channel H1 or the third channel H3) that the first electronic device 10 communicates with the network access device 20, the first electronic device 10, which uses a single antenna (not shown) to communicate with both the network access device 20 and the second electronic device 12, can reduce Wi-Fi throughput being downgraded due to frequently switching transmission channel. In sum, the multi-device system 100 of the present disclosure has the advantage of improved performance.

The disclosed methods, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the at least one processor to provide a unique apparatus that operates analogously to application specific logic circuits.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A wireless connection method applicable to a multi-device system, wherein the multi-device system comprises a first electronic device and a second electronic device, and the wireless connection method comprises:

based on that the first electronic device is connected to a network access device, by the first electronic device, enabling a wireless communication function through a first channel, wherein a first wireless connection is established between the first electronic device and the network access device at the first channel;

by the first electronic device, establishing a second wireless connection with the second electronic device at the first channel;

by the first electronic device, performing a handoff from the network access device to another network access device;

by the first electronic device, disabling the wireless communication function enabled through the first channel; and by the first electronic device, enabling the wireless communication function through a third channel, wherein a third wireless connection is established between the first electronic device and the another network access device at the third channel.

2. The wireless connection method of claim 1, wherein enabling the wireless communication function through the first channel comprising:

by the first electronic device, creating a peer-to-peer (P2P) group at the first channel.

3. The wireless connection method of claim 2, further comprising:

by the first electronic device, sending a P2P group information of the P2P group through a short distance wireless connection established between the first electronic device and the second electronic device, wherein the P2P group information comprises a P2P group name, an access password and channel information indicating the first channel.

4. The wireless connection method of claim 1, further comprising:

by the first electronic device, sending an access information to the second electronic device through a short distance wireless connection established between the first electronic device and the second electronic device, wherein the access information comprises a Service Set Identifier (SSID), an access password and channel information indicating the first channel.

5. The wireless connection method of claim 4, wherein both the first wireless connection and the second wireless connection are established under Wi-Fi protocol, and the short distance wireless connection is established under Bluetooth Low Energy (BLE) protocol.

6. The wireless connection method of claim 1 wherein performing the handoff from the network access device to the another network access device comprises:

by the first electronic device, switching from connecting the network access device to connecting the another network access device.

7. The wireless connection method of claim 1, wherein disabling the wireless communication function enabled through the first channel comprises:

removing a peer-to-peer (P2P) group created at the first channel, wherein the first electronic device and the second electronic device are in the P2P group.

8. The wireless connection method of claim 1, further comprising:

based on that the first electronic device is not connected to the network access device, by the first electronic device, enabling the wireless communication function through a second channel; and by the first electronic device, establishing the second wireless connection with the second electronic device at the second channel.

9. The wireless connection method of claim 8, further comprising:

by the first electronic device, finding another network access device available for connection;

by the first electronic device, disabling the wireless communication function enabled through the second channel; and by the first electronic device, enabling the wireless communication function through a third channel, wherein a third wireless connection is established between the first electronic device and the another network access device at the third channel.

10. A multi-device system, comprising:

a first electronic device, configured to connect a network access device, and configured to enable a wireless communication function through a first channel in a condition that the first electronic device is connected to the network access device, wherein a first wireless connection is established between the first electronic device and the network access device at the first channel; and a second electronic device, configured to establish a second wireless connection with the first electronic device at the first channel, wherein the first electronic device is configured to perform a handoff from the network access device to another network access device, is configured to disable the wireless communication function enabled through the first channel, and is configured to enable the wireless communication function through a third channel, wherein a third wireless connection is established between the first electronic device and the another network access device at the third channel.

11. The multi-device system of claim 10, wherein the first electronic device is configured to create a peer-to-peer (P2P) group at the first channel.

12. The multi-device system of claim 11, wherein the first electronic device is configured to send a P2P group information of the P2P group through a short distance wireless connection established between the first electronic device and the second electronic device, wherein the P2P group information comprises a P2P group name, an access password and channel information indicating the first channel.

13. The multi-device system of claim 10, wherein the first electronic device is configured to send an access information to the second electronic device through a short distance wireless connection established between the first electronic device and the second electronic device, wherein the access information comprises a Service Set Identifier (SSID), an access password and channel information indicating the first channel.

14. The multi-device system of claim 10, wherein the first electronic device is configured to switch from connecting the network access device to connecting the another network access device.

15. The multi-device system of claim 10, wherein the first electronic device is configured to remove a peer-to-peer (P2P) group created at the first channel, wherein the first electronic device and the second electronic device are in the P2P group.

16. The multi-device system of claim 10, wherein the first electronic device is configured to enable the wireless communication function through a second channel in a condition that the first electronic device is not connected to the network access device, and is configured to establish the second wireless connection with the second electronic device at the second channel.

17. The multi-device system of claim 16, wherein the first electronic device is configured to find another network access device available for connection, is configured to disable the wireless communication function enabled through the second channel, and is configured to enable the wireless communication function through a third channel, wherein a third wireless connection is established between the first electronic device and the another network access device at the third channel.

18. A non-transitory computer readable storage medium storing a computer program which, when executed by a processor, causes the processor to perform a wireless connection method applicable to a multi-device system, wherein the multi-device system comprises a first electronic device and a second electronic device, and the wireless connection method comprises:

based on that the first electronic device is connected to a network access device, by the first electronic device, enabling a wireless communication function through a first channel, wherein a first wireless connection is established between the first electronic device and the network access device at the first channel;

by the first electronic device, establishing a second wireless connection with the second electronic device at the first channel;

by the first electronic device, performing a handoff from the network access device to another network access device;

by the first electronic device, disabling the wireless communication function enabled through the first channel; and by the first electronic device, enabling the wireless communication function through a third channel, wherein a third wireless connection is established between the first electronic device and the another network access device at the third channel.

* * * * *